US008725181B2

(12) United States Patent
Walter (10) Patent No.: US 8,725,181 B2
(45) Date of Patent: *May 13, 2014

(54) PERSONAL CELLULAR ZONE WITH SIGNAL RESOLUTION

(75) Inventor: Edward Walter, Boerne, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1429 days.

This patent is subject to a terminal disclaimer.

(21) Appl. No.: 11/968,493

(22) Filed: Jan. 2, 2008

(65) Prior Publication Data
US 2008/0153478 A1 Jun. 26, 2008

Related U.S. Application Data

(63) Continuation of application No. 11/150,945, filed on Jun. 13, 2005, now Pat. No. 7,340,261.

(51) Int. Cl.
*H04W 24/00* (2009.01)

(52) U.S. Cl.
USPC ............ 455/456.6; 455/435.1; 455/436; 455/442; 455/456.2

(58) Field of Classification Search
USPC ........ 455/456.2, 436, 422.1, 443, 452.2, 437, 455/439, 442, 435.1, 435.2
See application file for complete search history.

(56) References Cited

U.S. PATENT DOCUMENTS

| | | | |
|---|---|---|---|
| 6,141,547 A | 10/2000 | Rousseau et al. | |
| 6,879,600 B1 | 4/2005 | Jones et al. | |
| 7,260,399 B1 * | 8/2007 | Oh et al. | 455/436 |
| 7,295,532 B2 * | 11/2007 | Haller et al. | 370/328 |
| 7,606,189 B1 * | 10/2009 | Lee et al. | 370/328 |
| 2004/0264410 A1 | 12/2004 | Sagi et al. | |
| 2004/0266435 A1 * | 12/2004 | de Jong et al. | 455/436 |
| 2005/0130657 A1 * | 6/2005 | Creamer et al. | 455/436 |
| 2006/0073836 A1 | 4/2006 | Laroia et al. | |
| 2006/0079284 A1 | 4/2006 | Lu et al. | |
| 2006/0229101 A1 * | 10/2006 | LaBauve et al. | 455/560 |

OTHER PUBLICATIONS

CDMA & GSM Cellular Technology, www.protocols.com/pbook/cellular.htm, retrieved May 17, 2005.

* cited by examiner

*Primary Examiner* — Khai M Nguyen
(74) *Attorney, Agent, or Firm* — Jackson Walker L.L.P.

(57) ABSTRACT

A method and apparatus for providing a cellular zone is disclosed. A communication link connects a cellular base station and a wireless access point. A typical communication link can be a wire-based communication network, such as the Internet, using IP telephony protocol. The wireless access point communicates with a cell phone over a cellular frequency and thereby establishes the cellular zone. Where the area of the cellular zone and the coverage area of the cellular base station overlap, continuous arbitration is performed to select a communications channel. The strength of a first signal received from the cellular base station is compared to the strength of a second signal received from the wireless access point. Selection criteria include signal strength and a time-oriented criteria to maintain continuity of communication channel.

16 Claims, 6 Drawing Sheets

PERSONAL CELLULAR ZONE WITH SIGNAL RESOLUTION

RELATED APPLICATION

This application is a continuation of U.S. patent application Ser. No. 11/150,945, filed Jun. 13, 2005, the contents of which are hereby incorporated in their entirety by reference.

BACKGROUND OF THE INVENTION

1. Field of the Invention

The present invention relates to the field of cellular communications. In particular, the present invention provides a method and apparatus for integrating a cellular zone into a cellular communications network.

2. Description of the Related Art

Currently, cellular networks provide cellular telephone service to wide geographical areas. A cellular network generally comprises a set of overlapping cells, a cell being a geographical area within radio contact of a fixed transmitter, normally known as a base station. Base stations consist of transceivers which send and receive signals to other base stations within a given frequency range as well as to any distributed transceivers (often a cellular phone) with the cell. Cells are positions so as to overlap with each other, thereby providing radio coverage over a greater area than the area of any one cell. Radio communication between base stations is facilitated by placing one base station within the coverage area of another base station. A handing-off protocol enables propagation of a signal from one base station to another and, by extension, throughout the network. Cellular networks are inherently asymmetric with a set of fixed main transceivers each serving a cell and a set of distributed transceivers which provide services to the network's users.

The primary requirement for operation of a cellular network is a way for the distributed transceivers to distinguish between a signal from its own transmitter and a signal from other transmitters. Two common solutions to this are frequency division multiple access (FDMA) and code division multiple access (CDMA). FDMA works by assigning a different operational frequency for each neighbouring cell. By tuning to the frequency of a chosen cell the distributed stations can avoid the signal from other neighbours. CDMA is a form of multiplexing, which enables numerous signals to occupy a single transmission channel, optimizing the use of available bandwidth. The technology is used in ultra-high-frequency (UHF) cellular telephone systems in the 800-MHz and 1.9-GHz bands. CDMA uses spread spectrum by multiple transmitters to send to the same receiver on the same frequency channel at the same time without harmful interference. In spread spectrum technology, the frequency of the transmitted signal is made to vary according to a defined pattern (code), so it can be intercepted only by a receiver whose frequency response is programmed with the same code, so it follows exactly along with the transmitter frequency. The CDMA channel is nominally 1.23 MHz wide.

Cellular coverage is typically provided by GSM/CDMA (Global System for Mobile telecommunications/Code Division Multiple Access). GSM is a globally accepted standard for digital cellular communication. In GSM, both signaling and speech channels are digital, which means that it is seen as a second-generation (2G) mobile phone system. GSM systems provide higher digital voice quality and low cost alternatives to making calls, such as text messaging.

New developments are emerging in which a dual mode mobile phone using both 802.11 and GSM/CDMA reside on the same handset. IEEE 802.11, or Wi-Fi, denotes a set of Wireless LAN standards developed by Working Group 11 of the IEEE LAN/MAN Standards Committee (IEEE 802). The term is also used to refer to the original 802.11, which is now sometimes called "802.11 legacy." The 802.11 family currently includes six over-the-air modulation techniques that all use the same protocol, the most popular (and prolific) techniques are those defined by the a, b, and g amendments to the original standard. 802.11b and 802.11g standards use the unlicensed 2.4 gigahertz (GHz) band. The 802.11a standard uses the 5 GHz band. Operating in an unregulated frequency band, 802.11b and 802.11g equipment can incur interference from microwave ovens, cordless phones, and other appliances using the same 2.4 GHz band. However, using the existing wireless protocols of the cellular carrier enables operating with existing handsets with no modification required.

If the distributed transceivers are mobile and moving from cell to cell, they have to change radio contact from cell to cell. The mechanism for this transfer depends on the type of network and the circumstances of the change. For example, if there is an ongoing continuous communication, then transfer should be made to occur without interruption. In this case, there must be clear coordination between the base station and the mobile station. Typically such systems use some kind of multiple access independently in each cell, so an early stage of such a handover is to reserve a new channel for the mobile station on the new base station which will serve it. The mobile then moves from the channel on its current base station to the new channel and from that point on communication takes place.

With new technologies, there is a need for methods of arbitrating signals between carrier systems. Additionally, as the "wired" and "wireless" worlds of communication come together, and as different types of wireless technologies merge, the issue of carrier signal arbitration and selection becomes increasingly important. New methods will address issues relating to signal platforms. Users typically demand increased signal strength and signal quality. Thus, these new methods should provide improved signal quality.

Although cellular network cover wide areas, there remain geographic areas that are still uncovered, for various reasons. Some of these areas have a small population base (customer base), making it not financially viable to install a cell tower (base station) to provide coverage in those areas. Other areas are too remote to justify installation. In other areas, obstructions such as mountains, hills, trees, etc. degrade performance. In addition, man-made forms of interference, such as power lines, degrade the signal. All of these factors may lead to extremely poor signal quality to no signal in a given area. In the past, commercial organizations have installed special cellular antennas in commercial areas, such as malls, where a cellular user might have a problem accessing a carrier signal through thick concrete and metal. However, there is an ongoing need to provide financially viable cellular coverage in areas that do not have adequate carrier coverage and to arbitrate between signal carriers so as to provide signal coverage.

SUMMARY OF THE INVENTION

The present invention discloses a method and apparatus for providing a cellular zone. A communication link is provided between a cellular base station and a wireless access point. A cellular base station generally refers to a transceiver tower that is part of a cellular communication network. A wireless access point could be, for example, a Wireless (802.11)/Router with enhanced GSM/CDMA wireless capabilities. Alternately, the wireless access point could be a box providing GSM/CDMA and Ethernet capabilities. The wireless access point communicates with a cell phone using GSM/CDMA, but can optionally use 802.11 for communication. The communication link from the cellular base station to the cellular zone can be, for example, a wire-based communication network, such as the Internet. In one embodiment of the invention, the wire-based communication network is capable of transmitting signals using IP telephony. Cellular communication is provided between the wireless access point and a cellular telephony device to establish the cellular zone.

In one embodiment of the invention, the cellular zone and the coverage area of a nearby cellular base station are non-overlapping. In an alternative embodiment, the cellular zone and the coverage area of the cellular base station overlap in part. In the alternative embodiment with overlapping areas, a method is provided for arbitrating between a first signal received from the cellular base station and a second signal received from the wireless access point compares strengths of the first and second signals and selects between the first and second signal based on signal strength. The method of arbitrating further comprises a time-oriented criteria for signal selection to prevent excessive flipping between channels in cases where signal strengths are comparable or quickly fluctuating.

Examples of certain features of the invention have been summarized here rather broadly in order that the detailed description thereof that follows may be better understood and in order that the contributions they represent to the art may be appreciated. There are, of course, additional features of the invention that will be described hereinafter and which will form the subject of the claims appended hereto.

BRIEF DESCRIPTION OF THE DRAWINGS

For detailed understanding of the present invention, references should be made to the following detailed description of an exemplary embodiment, taken in conjunction with the accompanying drawings, in which like elements have been given like numerals.

DETAILED DESCRIPTION OF THE INVENTION

In view of the above, the present invention through one or more of its various aspects and/or embodiments is presented to provide one or more advantages, such as those noted below.

Figure 1:
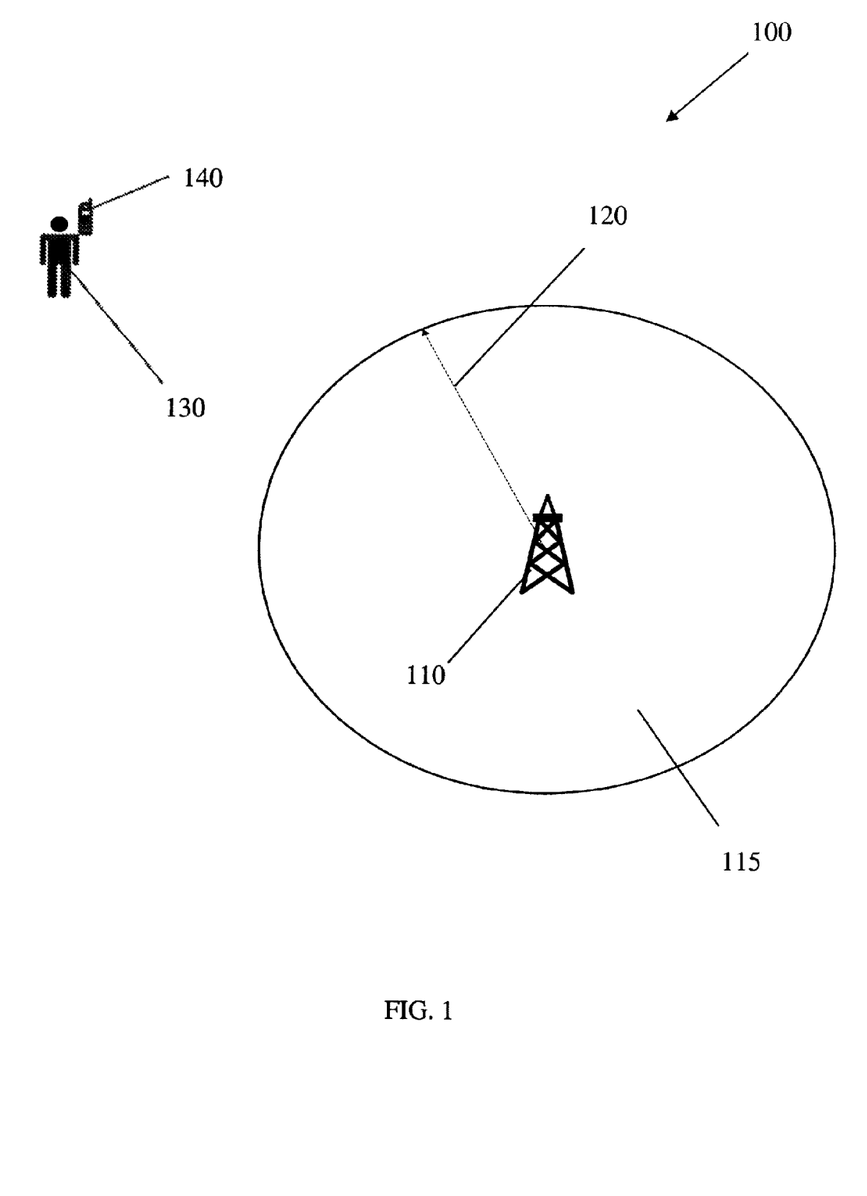
FIG. 1 illustrates a configuration in which a cellular signal is incapable of reaching an intended destination.

FIG. 1 illustrates a configuration 100 in which a cellular signal is incapable of reaching its intended destination. The base station generally comprises a transceiver tower used for the propagation and direction of signals over the cell 115 a linked cellular network. Base station 110 provides a maximum radius of coverage 120 to cell 115. Customer 130 happens to be located outside of the cell 115. Because of this, the cell phone 140 in his possession displays no signal strength and the user cannot initiate or receive a cellular call.

Figure 2:
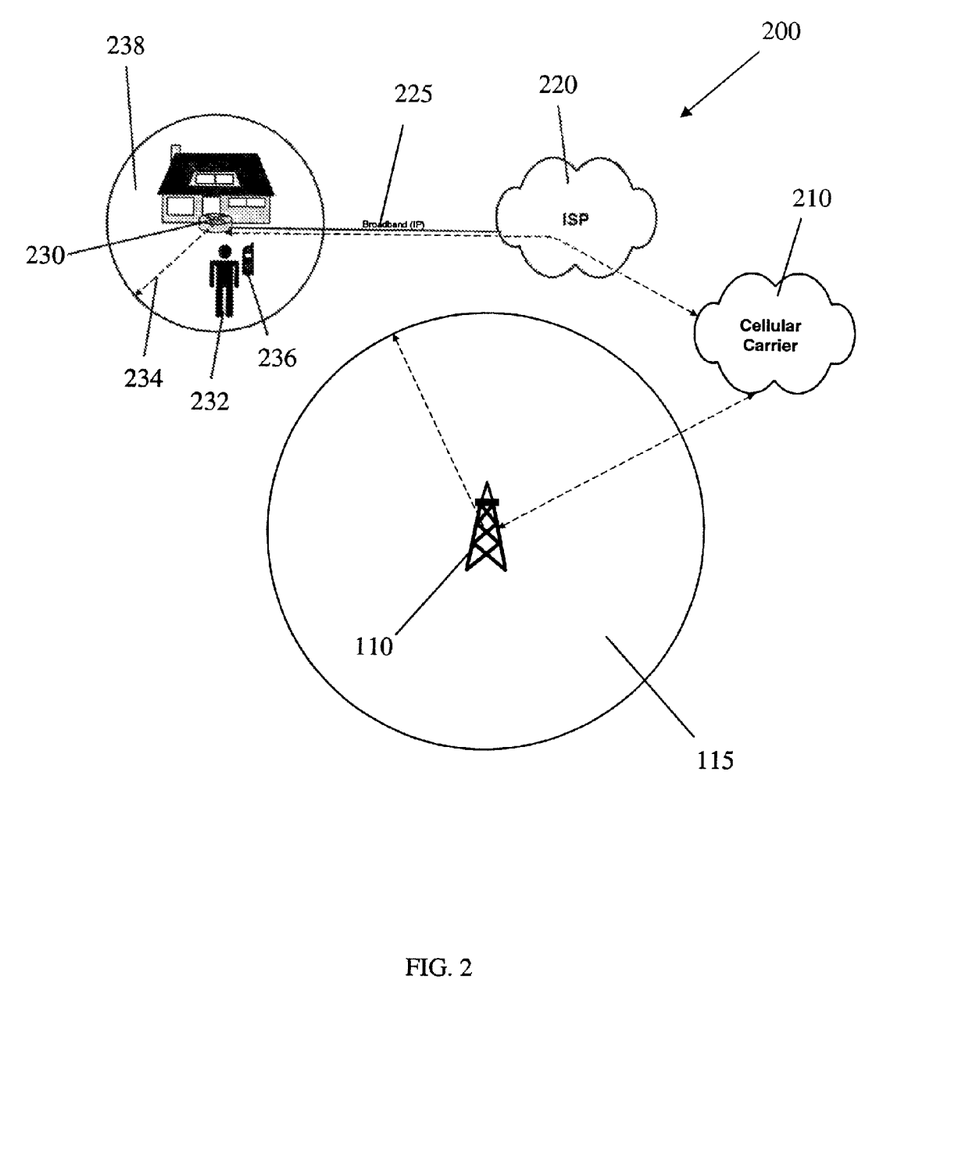
FIG. 2 illustrates an exemplary embodiment of the present invention.
Figure 3:
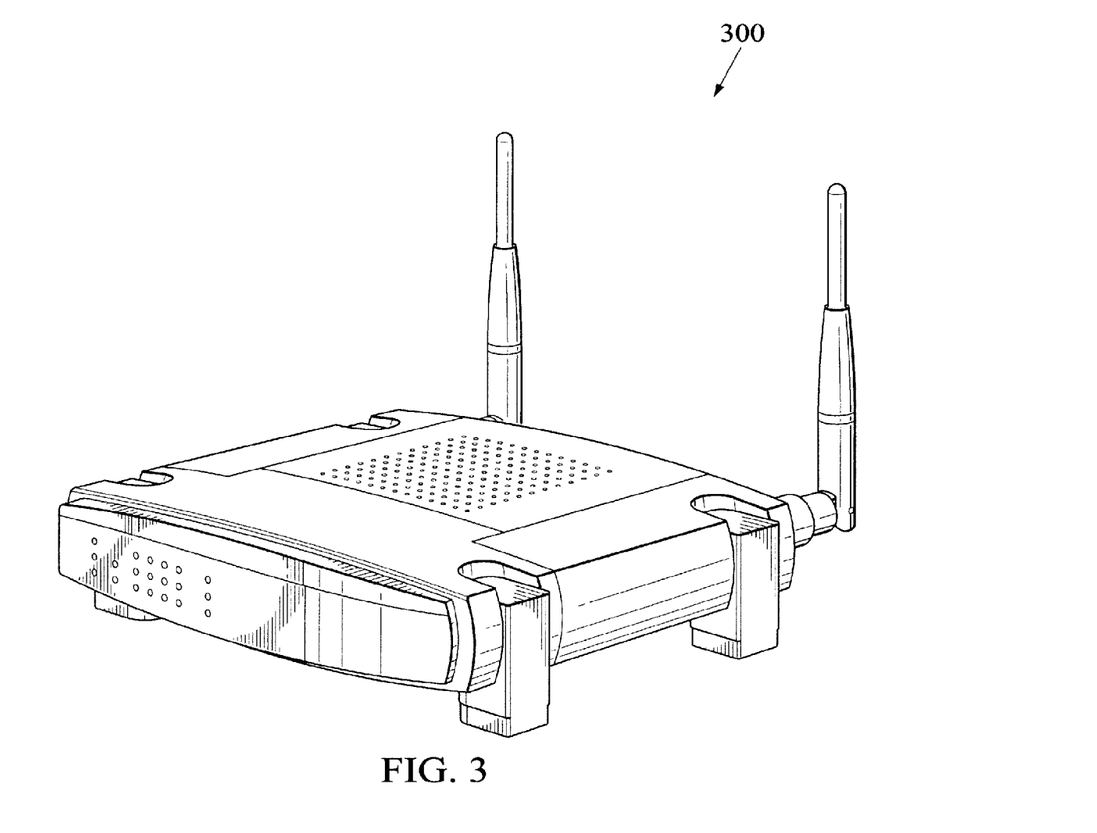
FIG. 3 illustrates an exemplary integrated unit enabling GSM (Global System for Mobile Telecommunications)

FIG. 2 illustrates an exemplary embodiment 200 of the present invention. A cellular zone 238 is provided by establishing a communication channel in the cellular frequency range between a cell phone 236 and a wireless access point 230. The wireless access point 230 provides cellular coverage over a maximum radius of coverage 234. The wireless access point 230 communicates with cell phone 236 using GSM/CDMA wireless capabilities. In an exemplary embodiment, wireless access point 230 comprises an integrated Wireless (802.11)/Router with enhanced GSM/CDMA wireless capabilities. In an alternative embodiment, the wireless access point comprises a box that only provides GSM/CDMA and Ethernet capabilities and which plugs into an existing consumer Wireless AP/Router. FIG. 3 illustrates an exemplary GSM integrated unit 300.

A broadband connection 225, such as an Internet connection, connects the wireless access point 230 to an Internet Service Provider (ISP), which in turn connects to a cellular service provider 210. A typical broadband connection 225 could be provided using a DSL Broadband service. To integrate the wireless access point 230 with the cellular network, the customer purchases a cellular-ready device 236 and typically activates the cellular zone at their home through a registration process. Registration enables the carrier 210 to know to route calls through to the cellular zone. The wireless access point 230 registers over IP network (Internet) 220 to the cellular service provider 210. The cellular provider adds this wireless access point to its network coverage database and routes wireless calls to and from this location. The cellular carrier detects the entry of the cell phone 236 into the cellular zone 238 and routes phone calls appropriately. The connection from the cellular carrier 210 to the consumer's cell zone 238 is typically provided via IP telephony.

The cellular carrier 210 converts voice traffic from the base station 110 to an Internet Protocol (IP) telephony (i.e., Voice over Internet Protocol) and transmits the signal to the wireless access device 230 via ISP 220 and broadband connection 225. The wireless access point 230 converts the IP telephony signal of the cellular service provider 210 back to GSM/CDMA for transmission over cell zone 238. The cell zone 238 thus is an integrated part of the cellular provider's network, and the consumer's cellular phone 236 rings in the event of a cellular call being received at the wireless access point 230.

Figure 4:
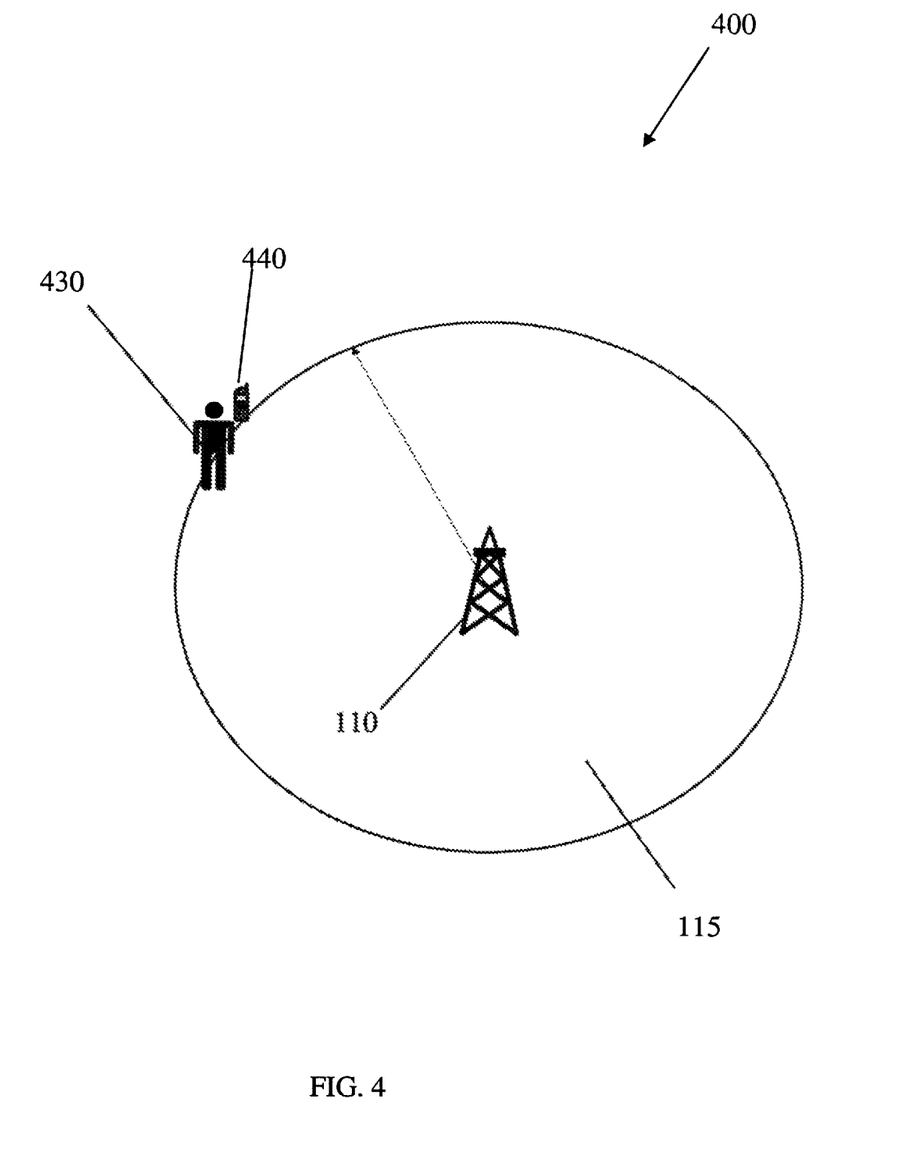
FIG. 4 illustrates a configuration in which degraded cellular reception occurs.

FIG. 4 illustrates one possible situation 400 in which degraded cellular reception can occur. A cellular customer 430 is located at the periphery of a cell 115 corresponding to base station 110. Due to the customer's location, the GSM/CDMA phone 440 experiences reduced signal strength and degraded quality. As a result, the user may or may not be able to initiate or receive a cellular call. Degraded quality can also be caused by physical, geographic, or manmade limitations.

Figure 5:
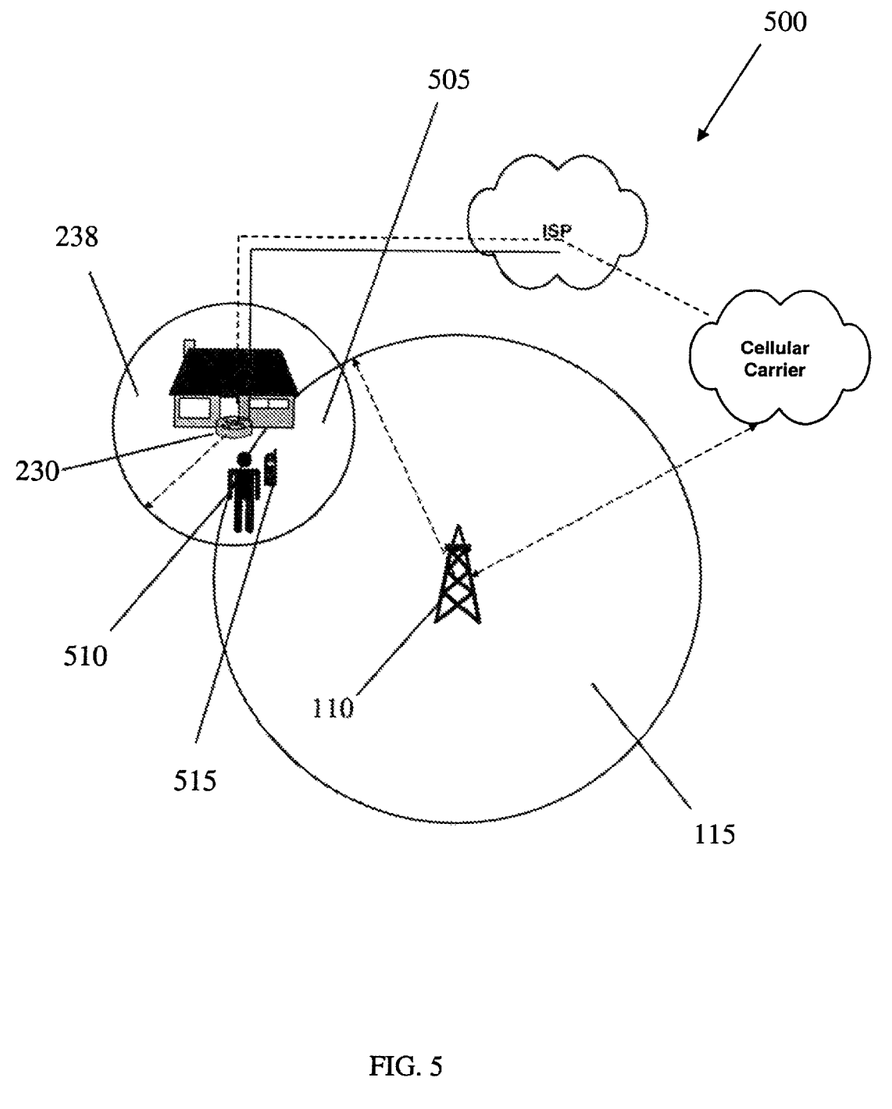
FIG. 5 illustrates an alternative embodiment of the present invention in which a cellular zone is located at the periphery of a cell zone.

FIG. 5 illustrates an alternative embodiment 500 of the present invention in which a cellular zone is located at the periphery of a cell zone. Cellular zone 238 and cell 115 overlap at intersection 505. Customer 510, using his cell phone 515 within intersection 505, can receive two signals: a first signal received from the base station (110), and a second signal received from the wireless access device (230) of the cellular zone. Resolution of the issue of zone overlap is facilitated by registering the cellular zone with the cellular provider's network. The GSM/CDMA wireless registration is managed by the cellular provider's network, enabling the handoff of wireless voice communications either from the cellular zone or the cellular network.

Figure 6:
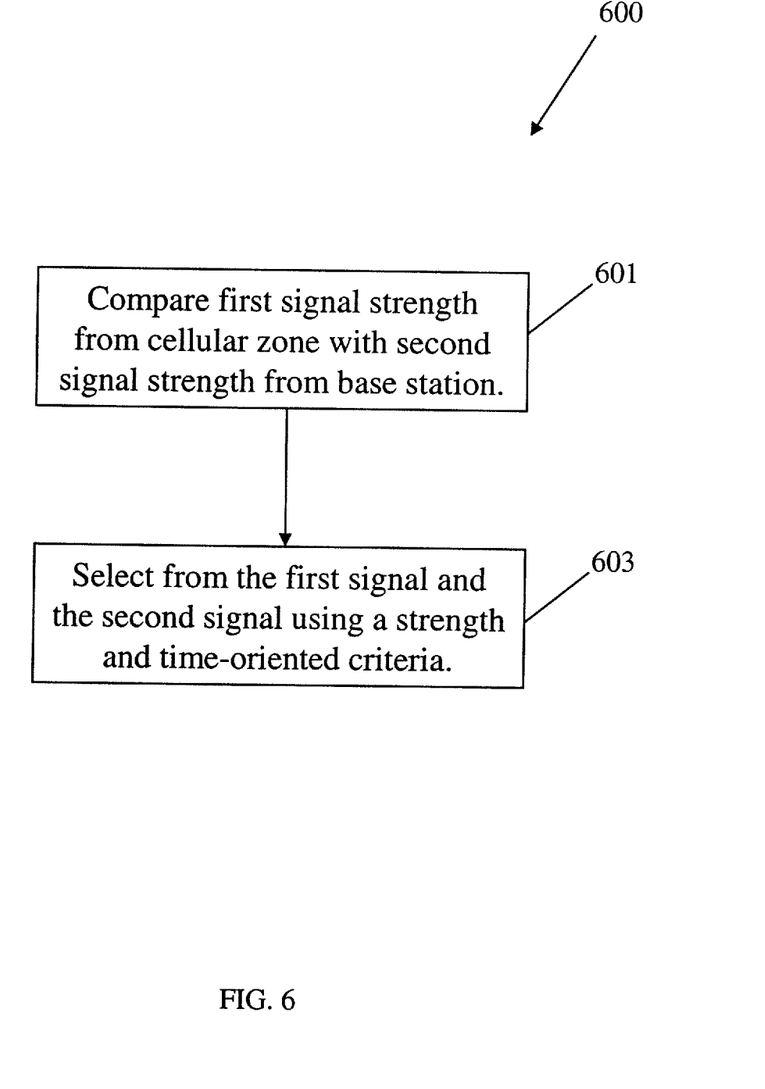
FIG. 6 illustrates a flowchart for arbitrating between signals received from a base station and from a wireless access device.

FIG. 6 illustrates a flowchart 600 for arbitrating between signals received from a base station and from a wireless access device, as can occur in the configuration of FIG. 5. The process of signal selection is repeated on a periodic basis during the course of a phone call. In Box 601, the strengths of the first signal from the cellular zone to the cellular phone and of the second signal from the cellular carrier's antennas are measured. These strengths are then compared to determine which is the stronger signal. In Box 603, the cell phone selects one of these signals to be used for communication based on a set of criteria. Criteria for signal selection include signal strength and a time-constraint. For example, when a stronger signal is clearly established, that stronger signal will be selected. In a situation where signal strengths are fluctuating over a short time period, the arbitrating process maintains the communication channel that it is currently using for a time. This enables continuity of signal reception and prevents constant flipping back and forth between channels. After a time in which the strength of another signal is clearly established as stronger, the stronger signal is again selected.

In an additional aspect of the present invention, the consumer can allow or disallow specific phone numbers from accessing their cell zone 238. As an example, a cell zone owner can only allow his cellular phone to operate using the cell zone 238. One advantage of restricting user access is to minimize excessive calls across the consumer's private broadband connection. Restriction can be made by identifying specific phone numbers.

Alternatively, the consumer could limit the number of cellular phone devices based upon the IP bandwidth in order to ensure a certain number of concurrent connections. This information can be factored into determining whether a cellular phone operating within a cellular zone leverages the carrier's network or the cellular zone.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

What is claimed is:

1. A method for providing a communication zone to a telephony device, comprising:
   enabling a wireless access point to establish a first communication link with a base station;
   enabling the wireless access point to establish a second communication link with a telephony device to provide the communication zone;
   restricting access to the wireless access point via the second communication link to the telephony device;
   arbitrating between a first signal received from the base station and a second signal received from the wireless access point;
   comparing a strength of the first signal with a strength of the second signal; and
   selecting a signal from one of the set consisting of the first signal and the second signal based on compared signal strength.

2. The method of claim 1, wherein the first communication link comprises a wire-based network.

3. The method of claim 2, wherein an IP telephony protocol is used to transmit signals within the wire-based network.

4. The method of claim 1, wherein code division multiple access is used to provide the second communication link.

5. The method of claim 1, further comprising:
   selecting a signal based on a time-oriented criteria.

6. The method of claim 1 further comprising identifying a phone number of the telephony device at the wireless access point.

7. A non-transitory computer-readable medium containing program instructions, executable by a processor, for providing a communication zone, the program instructions including instructions for:
   establishing a base station communication link between a wireless access point and a base station;
   establishing a device communication link between the wireless access point and a telephony device to provide the communication zone;
   restricting access to the device communication link to selected telephony devices including the telephony device; and
   responsive to the telephony device selecting, from a group of signals including an access point signal received from the wireless access point and a base station signal received from a base station, the access point signal;
   providing communication between the telephony device and the base station via the base station communication link and the device communication link.

8. The computer-readable medium of claim 7, wherein the access point signal and the base station signal are cellular communication signals.

9. The computer-readable medium of claim 7, wherein the base station is a cellular base station.

10. The computer-readable medium of claim 7, wherein code division multiple access is used to provide the access point signal.

11. A wireless access point including a processor having access to a computer readable medium including program instructions, the program instructions including instructions for:
   establishing a first communication link between a wireless access point and a base station;
   establishing a second communication link between the wireless access point and a telephony device to provide the communication zone;
   restricting access to the second communication link to a group of selected telephony devices including the telephony device;
   responsive to the telephony device selecting an access point signal received from the wireless access point as a communication signal, providing communication between the telephony device and the base station via the first communication link and the second communication link.

12. The wireless access point of claim 11, wherein the first communication link includes a wireline link.

13. The wireless access point of claim 12, wherein the first communication link employs an IP telephony protocol.

14. The wireless access point of claim 11, wherein the second communication link employs code division multiple access as an access method.

15. The wireless access point of claim 11, wherein providing the communication link is responsive to the telephony device selecting the access point signal from signals including the access point signal and a base station signal based on criteria including signal strength and a time-sharing criterion.

16. The wireless access point of claim 11, further comprising identifying a phone number of the telephony device.

* * * * *